(12) United States Patent
Corrao et al.

(10) Patent No.: US 10,747,685 B2
(45) Date of Patent: Aug. 18, 2020

(54) EXPIRING VIRTUAL CONTENT FROM A CACHE IN A VIRTUAL UNIVERSE

(71) Applicant: International Business Machines Corporation, Armonk, NY (US)

(72) Inventors: Ann Corrao, Raleigh, NC (US); Rick A. Hamilton, II, Charlottesville, VA (US); Brian M. O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 15/892,999

(22) Filed: Feb. 9, 2018

(65) Prior Publication Data

US 2018/0165220 A1 Jun. 14, 2018

Related U.S. Application Data

(63) Continuation of application No. 14/219,152, filed on Mar. 19, 2014, now Pat. No. 9,934,161, which is a
(Continued)

(51) Int. Cl.
*G06F 12/121* (2016.01)
*G06F 12/122* (2016.01)
(Continued)

(52) U.S. Cl.
CPC ........ *G06F 12/122* (2013.01); *G06F 16/9574* (2019.01)

(58) Field of Classification Search
CPC .......... A63F 2300/534; A63F 2300/538; A63F 2300/5546; A63F 2300/5593;
(Continued)

(56) References Cited

U.S. PATENT DOCUMENTS 5,956,039 A * 9/1999 Woods .................... H04L 29/06
345/419
6,163,773 A 12/2000 Kishi
(Continued)

OTHER PUBLICATIONS https://www.cs.cmu.ed/~ashu/papers/cmu-cs-05-112.pdf (Year: 2005).*
(Continued)

*Primary Examiner* — Ariel J Yu
*Assistant Examiner* — Dana Amsdell
(74) *Attorney, Agent, or Firm* — William H. Hartwell; Maxine L. Barasch; Keohane & D'Alessandro, PLLC

(57) ABSTRACT

Approaches for expiring cached virtual content in a virtual universe are provided. In one approach, there is an expiration tool, including an identification component configured to identify virtual content associated with an avatar in the virtual universe, an analysis component configured to analyze a behavior of the avatar in a region of the virtual universe, the behavior indicating a likely future location of the avatar, and an expiration component configured to expire cached virtual content associated with the avatar based on the behavior of the avatar in the region of the virtual universe, wherein the cached virtual content associated with the avatar in the future location is maintained in the cache longer than cached virtual content associated with the avatar in another region of the virtual universe.

20 Claims, 7 Drawing Sheets

Related U.S. Application Data continuation of application No. 12/363,758, filed on Jan. 31, 2009, now Pat. No. 8,694,734.

(51) Int. Cl.
*G06F 16/957* (2019.01)
*A63F 13/79* (2014.01)
*G06F 17/00* (2019.01)

(58) Field of Classification Search
CPC .......... A63F 2300/6027; A63F 2300/64; A63F 13/10; A63F 13/217; A63F 13/34; A63F 13/355; A63F 13/52; A63F 13/77; A63F 2300/5533; A63F 13/35; A63F 13/87; A63F 2300/5553; H04L 12/14; H04L 12/1403; H04L 67/22; H04L 67/2847; H04L 67/28; H04L 67/2852; H04L 67/34; G06F 16/9574; G06F 16/38; G06F 3/04815

See application file for complete search history.

(56) References Cited

U.S. PATENT DOCUMENTS

| | | | |
|---|---|---|---|
| 6,421,655 B1* | 7/2002 | Horvitz | G06N 5/04 706/61 |
| 6,598,125 B2* | 7/2003 | Romm | G06F 12/121 711/133 |
| 6,618,751 B1 | 9/2003 | Challenger et al. | |
| 6,868,439 B2 | 3/2005 | Basu et al. | |
| 7,181,690 B1 | 2/2007 | Leahy et al. | |
| 7,373,377 B2* | 5/2008 | Altieri | G06Q 30/02 709/203 |
| 7,451,088 B1 | 11/2008 | Ehlen et al. | |
| 7,849,420 B1* | 12/2010 | Amidon | H04L 67/1095 715/700 |
| 7,958,058 B2 | 6/2011 | Man et al. | |
| 8,014,542 B2 | 9/2011 | Chen et al. | |
| 8,126,985 B1* | 2/2012 | Kandekar | A63F 13/77 345/418 |
| 8,176,256 B2 | 5/2012 | Krishnaprasad et al. | |
| 8,239,776 B2 | 8/2012 | Bates et al. | |
| 8,287,383 B1 | 10/2012 | Etter et al. | |
| 8,631,457 B1 | 1/2014 | Schepis et al. | |
| 8,694,734 B2 | 4/2014 | Corrao et al. | |
| 8,732,591 B1 | 5/2014 | Mendes Da Costa et al. | |
| 8,826,383 B2 | 9/2014 | Ganz | |
| 9,108,109 B2 | 8/2015 | Pare et al. | |
| 9,384,469 B2 | 7/2016 | Alkov et al. | |
| 9,805,492 B2* | 10/2017 | Bolger | G06T 13/40 |
| 2001/0019330 A1 | 9/2001 | Bickmore et al. | |
| 2002/0032785 A1 | 3/2002 | Britt | |
| 2002/0198953 A1 | 12/2002 | O'Rourke et al. | |
| 2003/0037101 A1* | 2/2003 | Torabi | G06F 3/011 709/203 |
| 2004/0193441 A1* | 9/2004 | Altieri | G06Q 30/02 709/203 |
| 2004/0215731 A1 | 10/2004 | Tzann-en Szeto | |
| 2005/0144247 A1 | 6/2005 | Christensen et al. | |
| 2005/0197098 A1* | 9/2005 | Trossen | H04L 12/1403 455/406 |
| 2006/0094502 A1* | 5/2006 | Katayama | A63F 13/10 463/31 |
| 2006/0095532 A1 | 5/2006 | O'Rourke et al. | |
| 2006/0184886 A1* | 8/2006 | Chung | G06Q 10/107 715/758 |
| 2007/0053292 A1 | 3/2007 | DePaul et al. | |
| 2007/0133603 A1* | 6/2007 | Weaver | H04L 43/16 370/468 |
| 2007/0157252 A1* | 7/2007 | Perez | H04N 21/8186 725/61 |
| 2007/0210937 A1 | 9/2007 | Smith et al. | |
| 2007/0277220 A1* | 11/2007 | Shikuma | G11B 27/034 725/139 |
| 2008/0076547 A1* | 3/2008 | Bigelow | G06F 21/57 463/29 |
| 2008/0097915 A1* | 4/2008 | Golan | G06Q 30/0273 705/51 |
| 2008/0098064 A1* | 4/2008 | Sherinian | A63F 13/12 709/203 |
| 2008/0141321 A1 | 6/2008 | Kubat et al. | |
| 2008/0222363 A1 | 9/2008 | Khemani et al. | |
| 2008/0234047 A1* | 9/2008 | Nguyen | G07F 17/32 463/42 |
| 2008/0320222 A1* | 12/2008 | Dhodapkar | G06F 12/121 711/118 |
| 2009/0037382 A1 | 2/2009 | Ansari et al. | |
| 2009/0046094 A1* | 2/2009 | Hamilton, II | A63F 13/12 345/419 |
| 2009/0112906 A1 | 4/2009 | Shuster | |
| 2009/0165140 A1* | 6/2009 | Robinson | G06F 21/10 726/26 |
| 2009/0187669 A1 | 7/2009 | Thornton et al. | |
| 2010/0082798 A1 | 4/2010 | Bhogal et al. | |
| 2010/0156899 A1* | 6/2010 | Bolger | G06T 13/00 345/420 |
| 2010/0162403 A1 | 6/2010 | Dawson et al. | |
| 2010/0164947 A1* | 7/2010 | Bolger | G06T 13/40 345/419 |
| 2010/0199047 A1 | 8/2010 | Corrao et al. | |
| 2010/0211638 A1* | 8/2010 | Rougier | G06F 8/30 709/205 |
| 2010/0293477 A1* | 11/2010 | Pare | A63F 13/52 715/753 |
| 2010/0306652 A1* | 12/2010 | Bolger | H04L 67/2847 715/706 |
| 2011/0035553 A1 | 2/2011 | Shepstone et al. | |
| 2011/0055267 A1* | 3/2011 | Bolger | A63F 13/12 707/780 |
| 2013/0005466 A1 | 1/2013 | Mahajan et al. | |
| 2014/0208037 A1 | 7/2014 | Corrao et al. | |

OTHER PUBLICATIONS

Glencross, A. et al., "Exploiting Perception in High-Fidelity Virtual Environments," IEEE/ACM Digital Library, 2006, pp. 1-168.

Marvie, J-E. et al., "A Vrml97-X3D Extension for Massive Scenery Management in Virtual Worlds," copyright 2004 by the Association for Computing Machinery, Inc. 1-58113-845-8/04/0004, pp. 145-153, 188.

Dyreson, C. et al, "Managing Versions of Web Documents in a Transaction-time Web Server," WWW 2004, May 17-22, 2004, New York, New York, USA. ACM 1-58113-844-X/0410005, pp. 422-432.

Dana Amsdell, USPTO Office Action, U.S. Appl. No. 12/363,758, Notification Date Sep. 11, 2013, 25 pages.

Dana Amsdell, USPTO Notice of Allowance and Fee(s) Due, U.S. Appl. No. 12/363,758, dated Nov. 22, 2013, 33 pages.

Dana Amsdell, USPTO Office Action, U.S. Appl. No. 14/219,152, dated Aug. 11, 2016, 21 pages.

Dana Amsdell, USPTO Final Office Action, U.S. Appl. No. 14/219,152, dated Dec. 22, 2016, 21 pages.

Dana Amsdell, USPTO Notice of Allowance, U.S. Appl. No. 14/219,152, dated Nov. 22, 2017, 12 pages.

* cited by examiner

EXPIRING VIRTUAL CONTENT FROM A CACHE IN A VIRTUAL UNIVERSE

CROSS-REFERENCE TO RELATED APPLICATIONS

This patent document is a continuation of, and claims the benefit of, co-pending and co-owned U.S. patent application Ser. No. 14/219,152, filed Mar. 19, 2014, which is a continuation of commonly owned U.S. patent application Ser. No. 12/363,758, filed Jan. 31, 2009, issued Apr. 8, 2014 as U.S. Pat. No. 8,694,734. The entire contents of each of such applications are herein incorporated by reference.

FIELD OF THE INVENTION

This invention relates generally to virtual universes and more specifically to cache management of virtual content in a virtual universe.

BACKGROUND OF THE INVENTION

Virtual universes or virtual worlds are computer-based simulated environments intended for its users or residents to inhabit and interact via avatars, which are personas or representations of the users of the virtual universes. One example of a virtual universe is Second Life, which is a trademark of Linden Research Inc. in the United States. Avatars in these types of virtual universes, which can number well over a million, have a wide range of business and social experiences.

Many regions within a virtual universe contain complex environments with a large number of objects. In the prior art, virtual universes cache content from the virtual universe to increase the speed in which a region may be rendered. However, prolonged caching of unneeded objects consumes constrained resources of servers, cache appliances, clients, etc., while premature expiration of content degrades user experience as required objects must be reacquired. Methods such as Least Recently Used (LRU) and First-In-First Out (FIFO) to expire content from caches are well known in the art. However these methods are not effective because such methods are not optimal for use in virtual universes.

SUMMARY OF THE INVENTION

In one embodiment, there is a method for expiring virtual content in a computer database in a virtual universe. In this embodiment, the method comprises: identifying, using a computing device, virtual content associated with an avatar in the virtual universe; analyzing, using the computing device, a behavior of the avatar in a region of the virtual universe, the behavior indicating a likely future location of the avatar; and expiring, using the computing device, cached virtual content associated with the avatar based on the behavior of the avatar in the region of the virtual universe, wherein the cached virtual content associated with the avatar in the future location is maintained in the cache longer than cached virtual content associated with the avatar in another region of the virtual universe.

In a second embodiment, there is a computer system for expiring virtual content in a virtual universe. In this embodiment, the system comprises at least one processing unit and memory operably associated with the at least one processing unit. An expiration tool is storable in memory and executable by the at least one processing unit. The expiration tool comprises an identification component configured to identify virtual content associated with an avatar in the virtual universe; an analysis component configured to analyze a behavior of the avatar in a region of the virtual universe, the behavior indicating a likely future location of the avatar; and an expiration component configured to expire cached virtual content associated with the avatar based on the behavior of the avatar in the region of the virtual universe, wherein the cached virtual content associated with the avatar in the future location is maintained in the cache longer than cached virtual content associated with the avatar in another region of the virtual universe.

In a third embodiment, there is a computer-readable medium storing computer instructions, which when executed, enables a computer system to expire virtual content in a virtual universe, the computer instructions comprising: identifying virtual content associated with an avatar in the virtual universe; analyzing a behavior of the avatar in a region of the virtual universe, the behavior indicating a likely future location of the avatar; and expiring cached virtual content associated with the avatar based on the behavior of the avatar in the region of the virtual universe, wherein the cached virtual content associated with the avatar in the future location is maintained in the cache longer than cached virtual content associated with the avatar in another region of the virtual universe.

Figure 1:
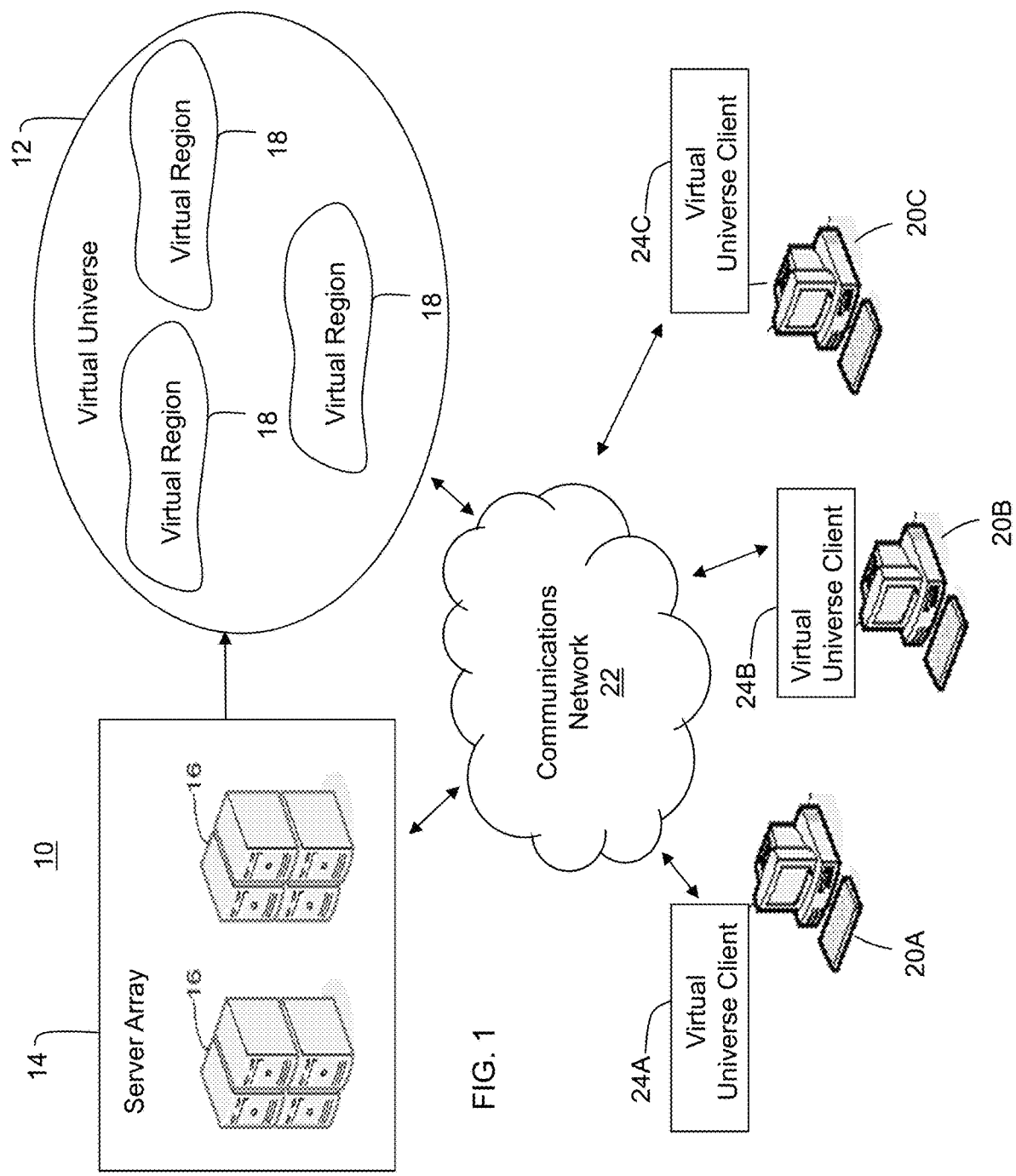
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to expiring (i.e., deleting, removing, etc.) cached virtual content in a virtual universe, such that the cache retains more useful textures, scripts and other virtual universe objects. In these embodiments, an expiration tool provides this capability. Specifically, the expiration tool comprises an identification component configured to identify virtual content (i.e., objects, textures and scripts) associated with an avatar in the virtual universe; an analysis component configured to analyze a behavior of the avatar in a region of the virtual universe; and an expiration component configured to expire cached virtual content associated with the avatar based on the behavior of the avatar in the region of the virtual universe.

FIG. 1 shows a high-level schematic diagram showing a networking environment 10 for providing a virtual universe 12 according to embodiments of this invention in which a service for expiring cached virtual content can be utilized. As shown in FIG. 1, networking environment 10 comprises a server array or grid 14 comprising a plurality of servers 16, each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Each virtual region 18 within virtual universe 12 may comprise a landscape having virtual content, such as buildings, stores, clubs, sporting arenas, parks, beaches, cities and towns all created by residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

Figure 2:
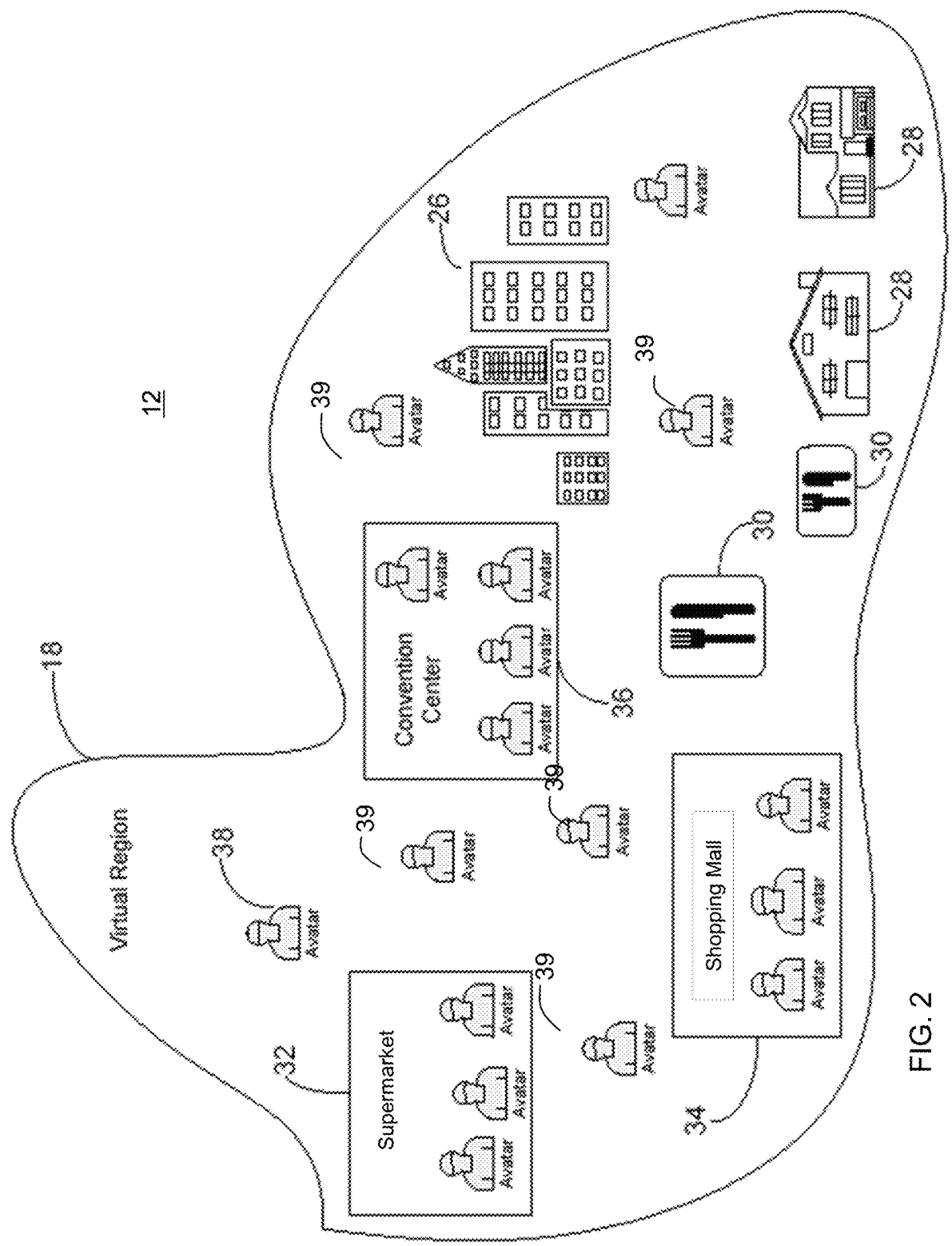
FIG. 2 shows a more detailed view of a virtual region shown in the virtual universe of FIG. 1.

FIG. 2 shows a more detailed view of an exemplary virtual region found in virtual universe 12. As an example, virtual region 18 shown in FIG. 2 comprises virtual content, including: a downtown office center 26, homes 28, restaurants 30, a supermarket 32 and a shopping mall 34 for shopping, and a convention center 36 for meetings and various conventions. An avatar 38, which as mentioned above, is a persona or representation of a user of the virtual universe, roams all about virtual region 18 by walking, driving, flying or even by teleportation or transportation, which is essentially moving through the virtual universe from one point to another, more or less instantaneously.

Figure 3:
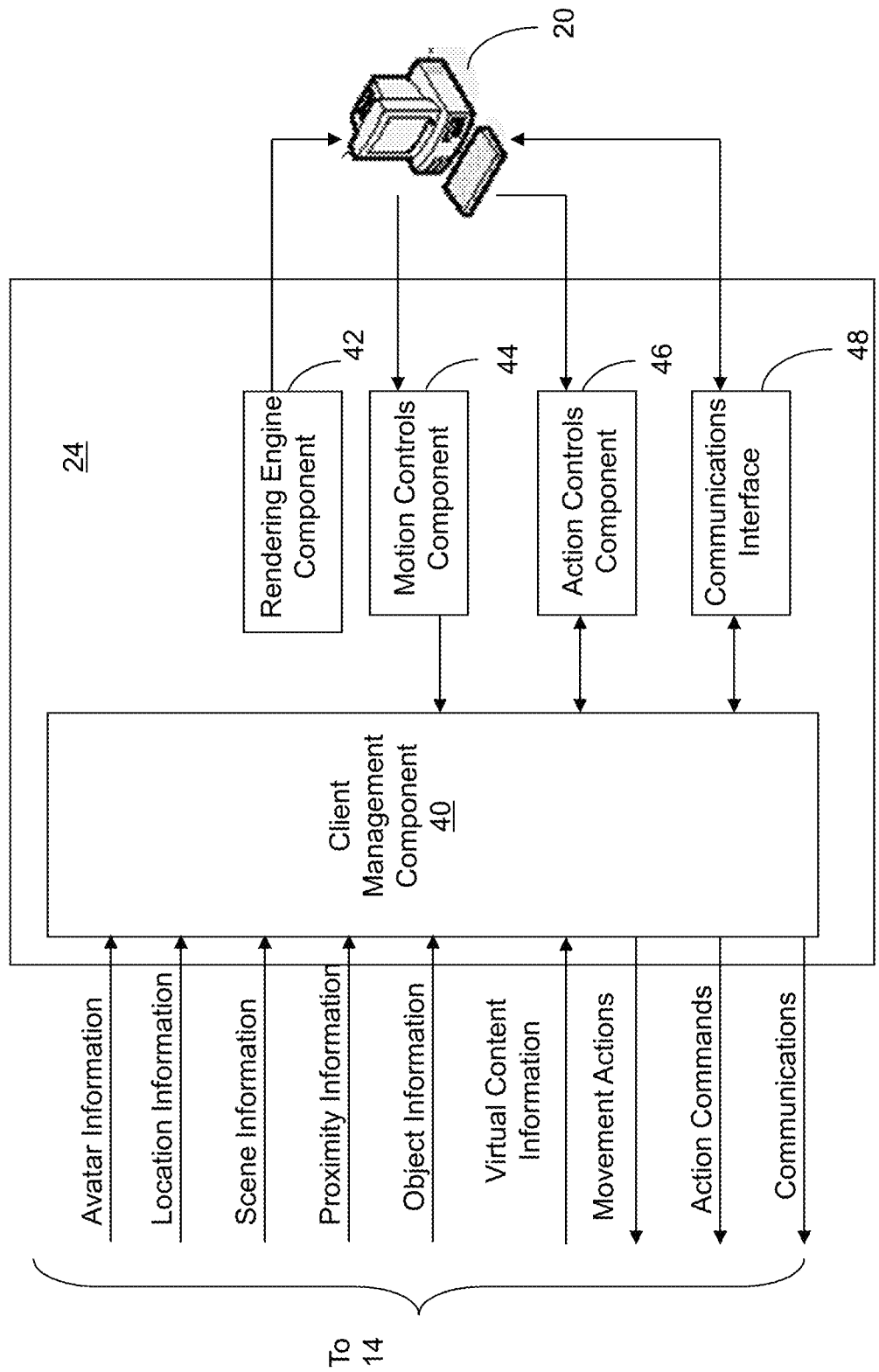
FIG. 3 shows a more detailed view of the virtual universe client shown in FIG.

FIG. 3 shows a more detailed view of virtual universe client 24 shown in FIG. 1. Virtual universe client 24, which enables users to interact with virtual universe 12, comprises a client management component 40, which manages actions, movements and communications made by a user through computer 20, as well as information received from virtual universe 12 through server array 14. A rendering engine component 42 enables the user of computer 20 to visualize his or her avatar within the surroundings of the particular region of virtual universe 12 that the avatar is presently located.

A motion controls component 44 enables the user to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking and electronic mail (e-mail).

FIG. 3 shows the various types of information received by client management component 40 from the virtual universe through server array 14. In particular, client management component 40 receives location information about the area that the user's avatar is near (e.g., what region or land he or she is in), as well as scene information (e.g., what the avatar sees). Client management component 40 also receives proximity information, which contains information on what the user's avatar is near, and virtual content information, which is information about the objects, texts, and scripts rendered in the virtual universe. FIG. 3 also shows the movement and action commands that are generated by the user and sent to the server array via client management component 40, as well as the communications that can be sent to other avatars within virtual universe 12.

Figure 4:
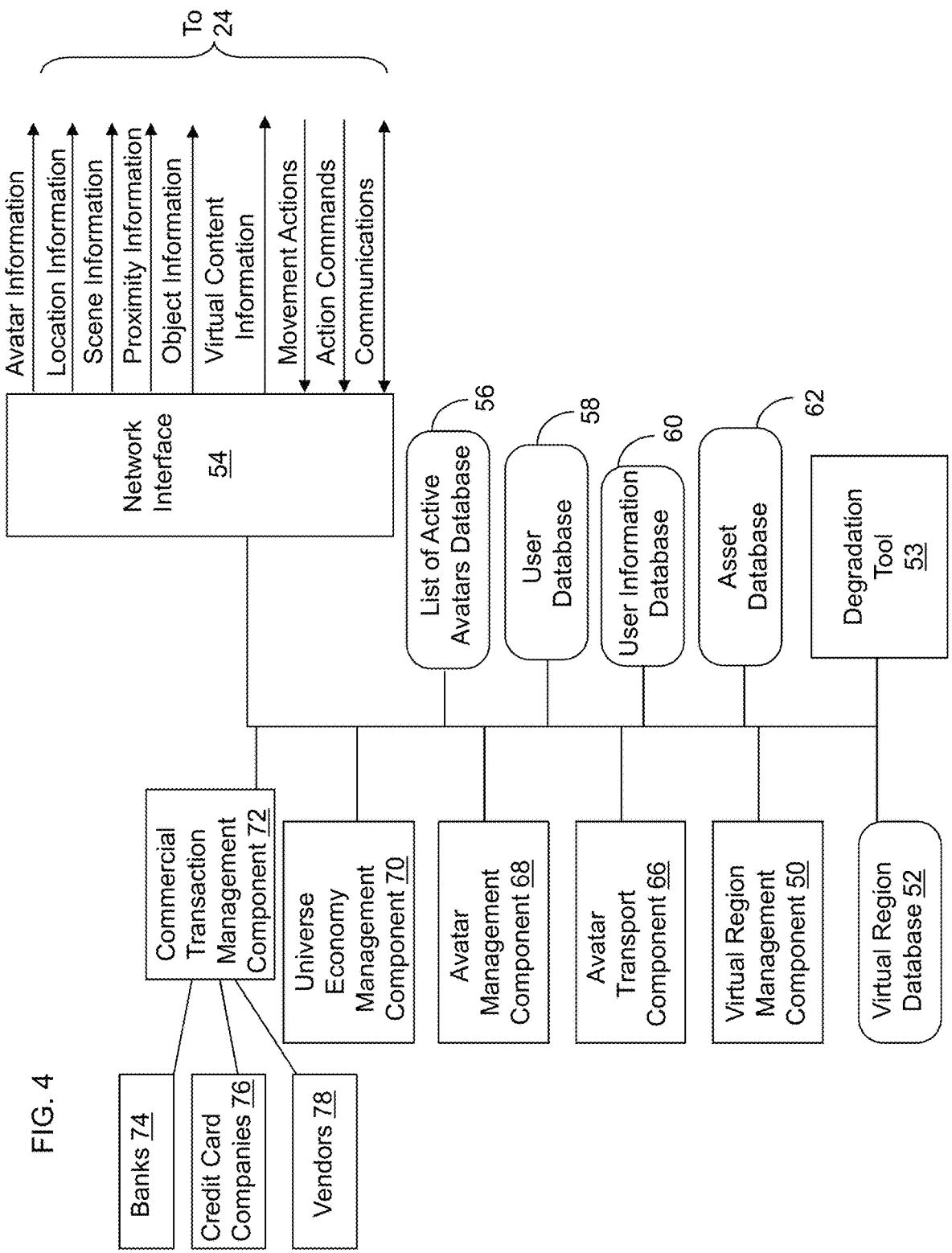
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

An expiration tool 53 expires virtual content stored within one or more caches that operate with virtual universe 12, as will be further described below. As shown in FIG. 4, in the exemplary embodiment, expiration tool 53 resides on the same computer system as server array 14. In other embodiments, expiration tool 53 might reside on the same side as virtual universe client 24, or reside on separate computers in direct communication with virtual universe servers 16 and virtual universe client 24.

A cache 45 is provided for storing virtual content. As used herein, cache 45 is a temporary storage area where likely to be accessed data can be stored for more rapid access. Cache 45 is a collection of data duplicating original values stored elsewhere or computed earlier, where the original data is expensive to fetch (due to slow access time) or to compute relative to the cost of reading cache 45. Once the data is stored in cache 45, future use may access the cached copy rather than downloading or rendering the original data, resulting in a lower average acquisition time. As will be further described below, virtual content can be expired (i.e., removed from cache 45) by expiration tool 53 such that the virtual content that is more likely to be needed in the near future is maintained in cache 45. Cache 45 may be a component of virtual universe server 14 (as shown), may reside on virtual universe clients 24, or may be an external caching device.

As shown in FIG. 4, there are several different databases for storing information. In particular, a virtual content database 52 stores information on all of the virtual content within virtual region 18, typically in the form of metadata associated with the virtual content renderable in the virtual universe. Specifically, virtual region database 52 contains metadata information about the objects, texts and scripts associated with the virtual content in the virtual region.

Database 56 contains a list of all the avatars that are online in the virtual universe 12, while databases 58 and 60 contain information on the actual human users of virtual universe 12. In one embodiment, user database 58 contains general information on the users such as names, addresses, interests, ages, as well as the virtual content associated with each avatar, while user information database 60 contains more sensitive information on the users such as email addresses, and billing information (e.g., credit card information) for taking part in transactions. Asset database 62 is a database that contains an inventory listing of the assets within the personal inventory of each avatar, such as hairpieces, weapons, jewelry, houses, cars, sporting equipment, appearance, attire, etc.

Those skilled in the art will recognize that databases 58-62 may contain additional information if desired. Databases 58-62 may be consolidated into a single database or table, divided into multiple database or tables, or clustered into a database system spanning multiple physical and logical devices. Further, although the above information is shown in FIG. 4 as being stored in databases, those skilled in the art will recognize that other means of storing information can be utilized. For example, asset database 62 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to travel through space from one point to another point, more or less instantaneously. Moving from one virtual region to a second virtual region requires the virtual content in the second region to be rendered as quickly as possible. An avatar management component 68 keeps track of what the avatars are doing while in the virtual universe. For example, avatar management component 68 can track where each avatar presently is in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own currency that users pay for with real-world money. The users can then take part in commercial transactions for their avatars through universe economy management component 70. For example, an avatar might want to pay for a service that provides the herein described expiration capability. In this case, the avatar would purchase this service using the virtual universe currency. In some instances, the user may want to take part in a commercial transaction that benefits the user and not an avatar. For example, while walking around a commercial zone, a user may see a pair of shoes that he or she would like for themselves and not their avatar. A commercial transaction management component 72 allows the user to participate in the transaction. In order to fulfill this type of transaction and others similarly related, commercial transaction management component 72 interacts with banks 74, credit card companies 76 and vendors 78.

Figure 5:
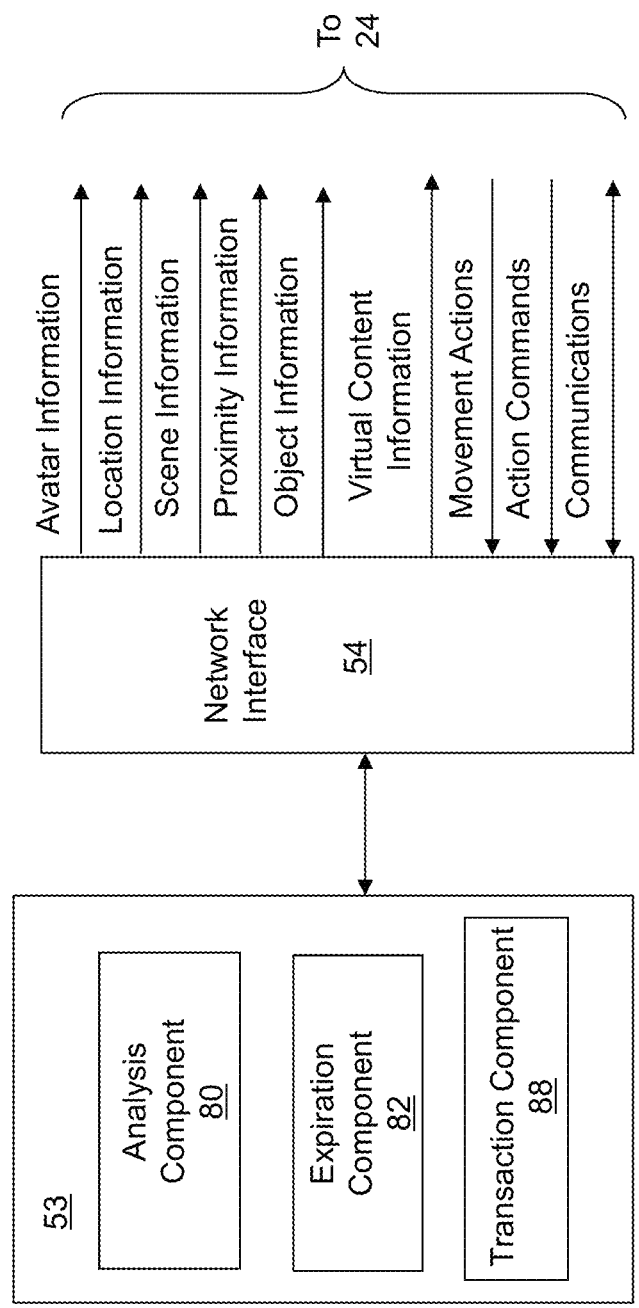
FIG. 5 shows an expiration tool according to one embodiment of this invention that operates in the environment shown in FIG. 1.

Referring now to FIGS. 2 and 5, expiration tool 53 of the present invention will be described in further detail. As cache 45 is finite in the amount of virtual content that it may store, it is generally desirable to discriminately expire (i.e., delete) virtual content that is less valuable based on dynamic criteria. To accomplish this, expiration tool 53 comprises an identification component 80 configured to identify virtual content associated with avatar 38 in virtual universe 12. In one embodiment, identification component 80 records and associates avatar 38 with its visible objects, textures, and scripts. Identification component 80 keeps track of what the avatars are doing while in the virtual universe. For example, identification component 80 can track where each avatar presently is in the virtual universe, as well as what activities it is performing or has recently performed. Each region 18 of virtual universe 12 may maintain its own association data repository to track each avatar within the region. Or, the association information can be stored for each avatar within a relational database, such as user database 58 (FIG. 4).

Identification component 80 operates with an analysis component 82, which is configured to analyze a behavior (e.g., an action or movement) of avatar 38 in a region (e.g., region 18) of virtual universe 12. The virtual content for avatar 38 may be dynamically recorded and updated as avatar 38 traverses virtual universe 12. For example, analysis component 82 notes the previous region avatar 38 has visited, the time in the current region, and the location avatar 38 visited next. Further, analysis component 82 is configured to analyze an interaction between avatar 38 and another avatar 39 within virtual universe 12. For example, during operation, avatar 38 may meet up with another avatar 39 (e.g., by teleportation) and spend a period of time in region 18. In this case, the virtual content for other regions currently unoccupied by avatar 38 and another avatar 39 are generally considered less likely to be immediately rendered. Further, once avatar 38 and another avatar 39 exit region 18, the virtual content for virtual region 18 is also considered less likely to be rendered from cache 45. In another example, conversations (textual or voice) between avatar 38 and another avatar 39 (via, users of VU 12) may influence the relative caching priority of virtual content within virtual universe 12. A conversation may indicate a plan or future location of avatar 38. For example, a conversation between avatar 38 and another avatar 39 may reveal that avatar 38 plans to visit region 12 to purchase an item of clothing at shopping mall 34 (FIG. 2). In this case, other regions, such as regions containing no clothing items are considered less likely of interest to avatar 38, and may be prioritized for expiration from cache 45.

Based on the behavior of avatar 38, an expiration component 84 is configured to expire the virtual content associated with avatar 38 within cache 45. Expiration component 84 determines whether avatar 38 is present within region 18 of virtual universe 12, as well as when to expire virtual content from cache 45 based on a multitude of triggers. In one embodiment, expiration component 84 is configured to expire the cached virtual content when avatar 38 logs-out (i.e., signs-off) of virtual universe 12. If an avatar logs-out of the virtual universe, all objects, texts, scripts in cache 45 related to that avatar are expired. The virtual universe may transmit a message to all regions, who may then in turn expire related content. In another embodiment, the virtual universe may maintain a master association database and expire all virtual content across the virtual universe related to a particular avatar.

In another embodiment, expiration component 84 is configured to expire the cached virtual content when avatar 38 exits the region (e.g., region 18) of virtual universe 12. For example, in the case that avatar 38 exits region 18, expiration component 84 retrieves the object/script/texture universally unique identifiers (UUIDs) from a regional repository (not shown) and transmits those UUIDs to cache 45 for expiration.

In another embodiment, virtual content is expired based on previous traversal patterns of avatar 38. Specifically, expiration component 84 is configured to expire the cached virtual content in the case that avatar 38 is unlikely to enter (or re-enter) a region (e.g., region 18) within a predefined time period. For example, expiration component 84 may expire virtual content related to avatar 38 only if, based on previous traversal patterns, it is unlikely that avatar 38 will re-enter the region, e.g., within the next five minutes. In this case, the stored virtual content may be expired if an average "time-away" for avatar 38 exceeds a specified threshold. Or in another example, if an activity within a virtual universe typically takes a specified amount of time, virtual content may be expired based on this time duration. For example, if playing a certain game in the virtual universe takes the average user 20 minutes, the virtual content may be automatically expired, e.g., after 25 minutes. Alternatively, the expiration time duration may be specific to each user, such that each user has a customized expiration duration for the activity. However, it will be appreciated that this example is non-limiting, as numerous approaches are possible for prioritizing the expiration of virtual content within the scope of the present invention. For example, expiration component 84 may calculate the number of times per day each avatar is in a region, the total number of visits to a region, the amount of virtual money spent in a region, etc.

In another embodiment of this invention, expiration tool 53 is used as a service to charge fees for facilitating the expiration of virtual content in the virtual universe. As shown in FIG. 5, expiration tool 53 comprises a transaction component 90 configured to charge an expiration fee for facilitating the expiration of the cached content in virtual universe 12. In this embodiment, the provider of the virtual universe or a third party service provider could offer this cache expiration as a service by performing the functionalities described herein on a subscription and/or fee basis. In this case, the provider of the virtual universe or the third party service provider can create, deploy, maintain, support, etc., expiration tool 53 that performs the processes described in the invention. In return, the virtual universe or the third party service provider can receive payment from the virtual universe residents via universe economy management component 70 and commercial transaction management component 72.

In still another embodiment, the methodologies disclosed herein can be used within a computer system to expire the virtual content in the virtual universe. In this case, expiration tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
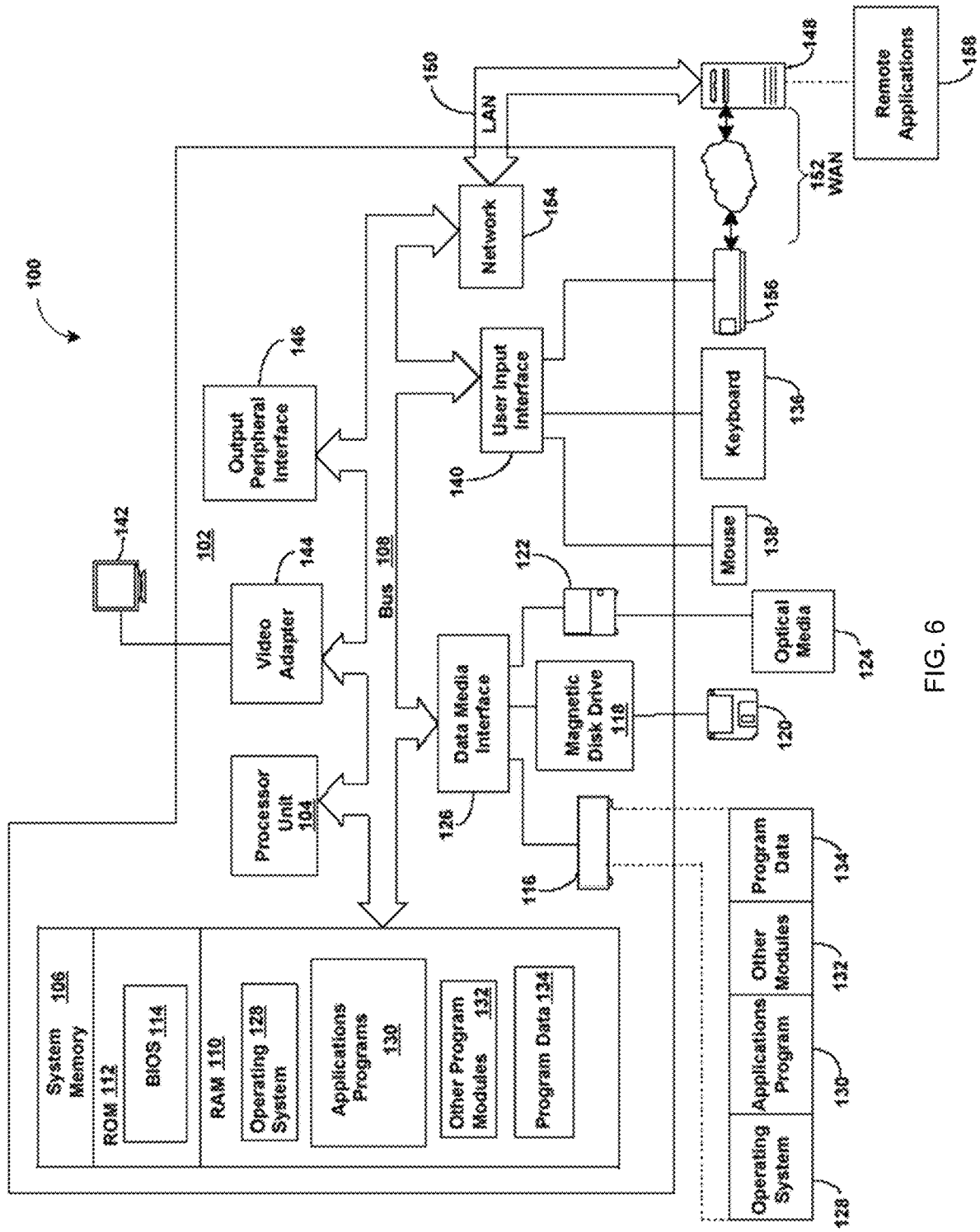
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112.

RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of operating system 128, one or more application programs 130 other program modules 132, and program data 134 or some combination thereof, may include an implementation of the networking environment 10 of FIG. 1 including server array 14, virtual universe client 24 and expiration tool 53. In one embodiment, the one or more application programs 130 include components of expiration tool 53 such as identification component 80, analysis component 82, expiration component 84, and transaction component 90.

Figure 7:
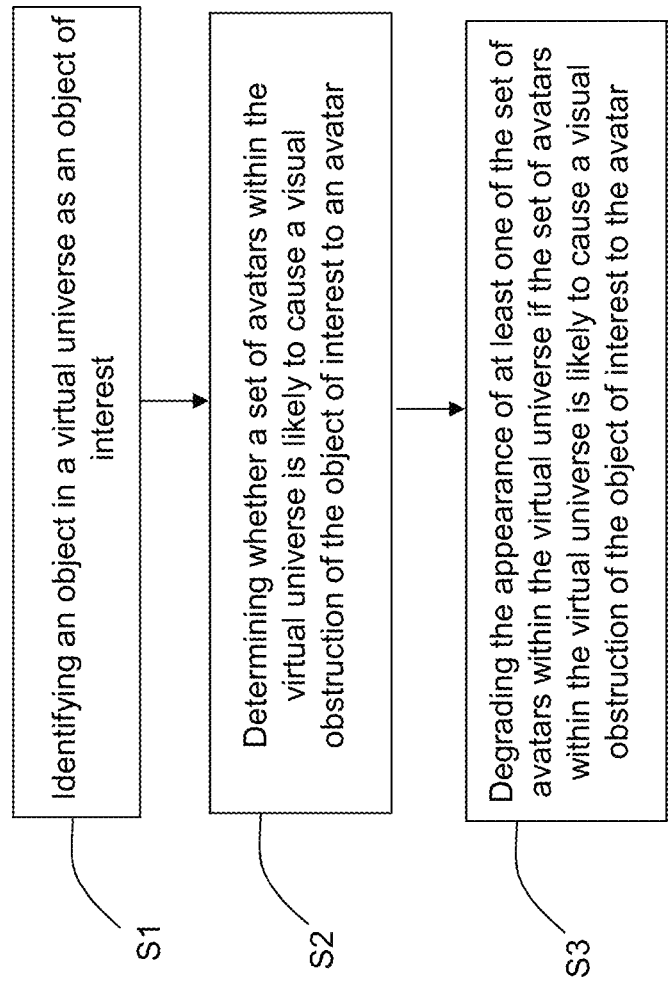
FIG. 7 shows a flow diagram of a method for expiring cached virtual content in the virtual universe according to embodiments of the invention.

The one or more program modules 130 carry out the methodologies disclosed herein, as shown in FIG. 7. According to one embodiment, in step S1, virtual content associated with an avatar in the virtual universe is identified. In step S2, a behavior of the avatar in a region of the virtual universe is analyzed, the behavior indicating a likely future location of the avatar. In step S3, cached virtual content associated with the avatar is expired based on the behavior of the avatar in the region of the virtual universe, wherein the cached virtual content associated with the avatar in the future location is maintained in the cache longer than cached virtual content associated with the avatar in another region of the virtual universe. The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, computer 102 is connected to LAN 150 via network interface or adapter 154. When used in a WAN networking environment, the computer typically includes a modem 156 or other means for establishing communications over WAN 152. The modem, which may be internal or external, may be connected to system bus 108 via user input interface 140 or other appropriate mechanism.

In a networked environment, program modules depicted relative to computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or the like.

It is apparent that there has been provided with this invention an approach for expiring virtual content within a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for expiring cached virtual content in a computer database in a virtual universe, comprising:
    identifying virtual content associated with an avatar in the virtual universe;
    analyzing at least one traversal pattern of the avatar prior to arriving at a current location within the virtual universe, wherein the at least one traversal pattern includes traversal of a particular region of the virtual universe;
    computing an average time-away for the avatar;
    determining, based on a conversation between the avatar and another avatar in the virtual universe, and the analysis of the traversal pattern of the avatar,
    that it is unlikely that the avatar will re-enter the particular region of the virtual universe in response to determining that the average time-away for the avatar exceeds a predetermined threshold, wherein the particular region is in a location different from the current location of the avatar;
    maintaining cached virtual content associated with the avatar in the current location; and
    expiring cached virtual content associated with the avatar in the particular region of the virtual universe.

2. The method according to claim 1, further comprising determining the current location of the avatar in the virtual universe.

3. The method according to claim 1, the analyzing comprising analyzing an interaction between the avatar and another avatar within the virtual universe.

4. The method according to claim 1, the expiring comprising expiring the cached virtual content when the avatar logs-out of the virtual universe.

5. The method according to claim 1, the expiring comprising expiring the cached virtual content when the avatar exits the region of the virtual universe.

6. The method according to claim 1, wherein the determining is based on a conversation between the avatar and another avatar in the virtual universe.

7. The method according to claim 1 further comprising charging an expiration fee for the expiring of the cached virtual content.

8. A computer system for expiring virtual content in a virtual universe, comprising:
    at least one processing unit;
        memory operably associated with the at least one processing unit; and
        an expiration tool storable in memory and executable by the at least one processing unit, the expiration tool configured to:
    identify virtual content associated with an avatar in the virtual universe;
    analyze at least one traversal pattern of the avatar prior to arriving at a current location within the virtual universe, wherein the at least one traversal pattern includes traversal of a particular region of the virtual universe;
    computing an average time-away for the avatar;
    determine, based on a conversation between the avatar and another avatar in the virtual universe, and the analysis of the traversal pattern of the avatar,
    that it is unlikely that the avatar will re-enter the particular region of the virtual universe in response to determining that the average time-away for the avatar exceeds a predetermined threshold, wherein the particular region is in a location different from the current location of the avatar;
    maintain cached virtual content associated with the avatar in the current location; and
    expire cached virtual content associated with the avatar in the particular region of the virtual universe.

9. The computer system according to claim 8, the expiration tool further configured to determine the current location of the avatar in the virtual universe.

10. The computer system according to claim 8, the expiration tool further configured to analyze an interaction between the avatar and another avatar in the virtual universe.

11. The computer system according to claim 8, wherein the expiration is performed when the avatar logs-out of the virtual universe.

12. The computer system according to claim 8, wherein the expiration is performed when the avatar exits the region of the virtual universe.

13. The computer system according to claim 8, wherein the determining is based on a conversation between the avatar and another avatar in the virtual universe.

14. The computer system according to claim 8, wherein the expiration tool is further configured to charge an expiration fee for the expiring of the cached virtual content.

15. A computer-readable hardware storage device storing computer instructions, which when executed, enables a computer system to expire virtual content in a virtual universe, the computer instructions upon execution, causing the computer system to:
    identify virtual content associated with an avatar in the virtual universe;
    analyze at least one traversal pattern of the avatar prior to arriving at a current location within the virtual universe, wherein the at least one traversal pattern includes traversal of a particular region of the virtual universe;
    compute an average time-away for the avatar;
    determine, based on a conversation between the avatar and another avatar in the virtual universe, and the analysis of the traversal pattern of the avatar,
    that it is unlikely that the avatar will re-enter the particular region of the virtual universe in response to determining that the average time-away for the avatar exceeds a predetermined threshold, wherein the particular region is in a location different from the current location of the avatar;
    maintain cached virtual content associated with the avatar in the current location; and
    expire cached virtual content associated with the avatar in the particular region of the virtual universe.

16. The computer-readable hardware storage device according to claim 15, the computer instructions further comprising determining the current location of the avatar in the virtual universe.

17. The computer-readable hardware storage device according to claim 15, the computer instructions for analyzing further comprising analyzing an interaction between the avatar and another avatar within the virtual universe.

18. The computer-readable hardware storage device according to claim 15, the computer instructions for expiring comprising expiring the cached virtual content when the avatar logs-out of the virtual universe.

19. The computer-readable hardware storage device according to claim 15, the computer instructions for expiring comprising expiring the cached virtual content when the avatar exits the region of the virtual universe.

20. The computer-readable hardware storage device according to claim 15, the computer instructions further comprising charging an expiration fee for the expiring of the cached virtual content.

\* \* \* \* \*